(12) United States Patent
Powell

(10) Patent No.: US 10,404,550 B1
(45) Date of Patent: *Sep. 3, 2019

(54) WEB SERVICE SELECTOR COMPONENT

(71) Applicant: OPEN INVENTION NETWORK LLC, Durham, NC (US)

(72) Inventor: Chad Eric Powell, The Woodlands, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,339

(22) Filed: May 1, 2018

Related U.S. Application Data

(63) Continuation of application No. 13/197,013, filed on Aug. 3, 2011, now Pat. No. 9,960,971.

(60) Provisional application No. 61/370,617, filed on Aug. 4, 2010.

(51) Int. Cl.
*H04L 12/24* (2006.01)
*H04L 29/08* (2006.01)

(52) U.S. Cl.
CPC ...... *H04L 41/5051* (2013.01); *H04L 41/5012* (2013.01); *H04L 67/16* (2013.01)

(58) Field of Classification Search
None
See application file for complete search history.

(56) References Cited

U.S. PATENT DOCUMENTS

| | | | | |
|---|---|---|---|---|
| 6,345,303 | B1 * | 2/2002 | Knauerhase | H04L 67/1008 707/999.01 |
| 2004/0064554 | A1 * | 4/2004 | Kuno | H04L 67/16 709/225 |
| 2004/0220910 | A1 * | 11/2004 | Zang | G06Q 10/04 |
| 2006/0004764 | A1 * | 1/2006 | Kurhekar | H04L 67/16 |

* cited by examiner

*Primary Examiner* — Scott B Christensen

(57) ABSTRACT

An apparatus, method, and a computer program are provided. In one embodiment, a request is transmitted to a selector module for an available web service and a response is received from the selector module for a web service server. The response includes an endpoint uniform resource indicator to allow a client module to transmit a web service request to an appropriate web service server.

16 Claims, 6 Drawing Sheets

WEB SERVICE SELECTOR COMPONENT

CROSS-REFERENCE TO RELATED APPLICATION

This application is a continuation of U.S. patent application Ser. No. 13/197,013 entitled WEB SERVICE SELECTOR COMPONENT, filed Aug. 3, 2011, now issued as U.S. Pat. No. 9,960,971 on May 1, 2018, which claims the benefit of U.S. Provisional Patent Application No. 61/370,617, filed on Aug. 4, 2010. The subject matter of the earlier filed applications is hereby incorporated by reference in its entirety.

FIELD

The present invention relates to a web service selector and, more particularly, to an apparatus and method that uses a web service selector to determine which web service server to use.

BACKGROUND

Generally, software that consumes web services directs calls up the web services via an endpoint URI. However, many times these web services may have a slow response time or throughput, or may not have a good overall reputation. Furthermore, the software may not be capable of determining the most suitable web service to use.

SUMMARY

Certain embodiments of the present invention may provide solutions to the problems and needs in the art that have not yet been fully identified, appreciated, or solved by current web service selecting software.

In accordance with an embodiment of the present invention, a computer-implemented method is provided. The method includes requesting a selector module for an available web service, and receiving a response from the selector module for a web service server. The response includes an endpoint uniform resource indicator to allow a client module to transmit a web service request to an appropriate web service server.

In accordance with another embodiment of the present invention, a computer-implemented method is provided. The method includes receiving, from a client module, a request for a web service server, and determining the web service server for the client module in order for the client module to transmit a web service request to the web service server. The method also includes transmitting an endpoint uniform resource indicator of the web service server to the client module.

In yet another embodiment of the present invention, an apparatus is provided. The apparatus includes a processor and memory having a set of instructions. The set of instructions is configured to cause the processor to receive, from a client module, a request for a web service server, and determine the web service server for the client module in order for the client module to transmit a web service request to the web service server. The set of instructions is further configured to cause the processor to transmit an endpoint uniform resource indicator of the web service server to the client module.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein relate to a web service selecting module that receives a request from a client module to access a web service. The web service selecting module performs a search of possible web services, and returns an endpoint uniform resource indicator that best fits the client module's requirements.

Figure 1:
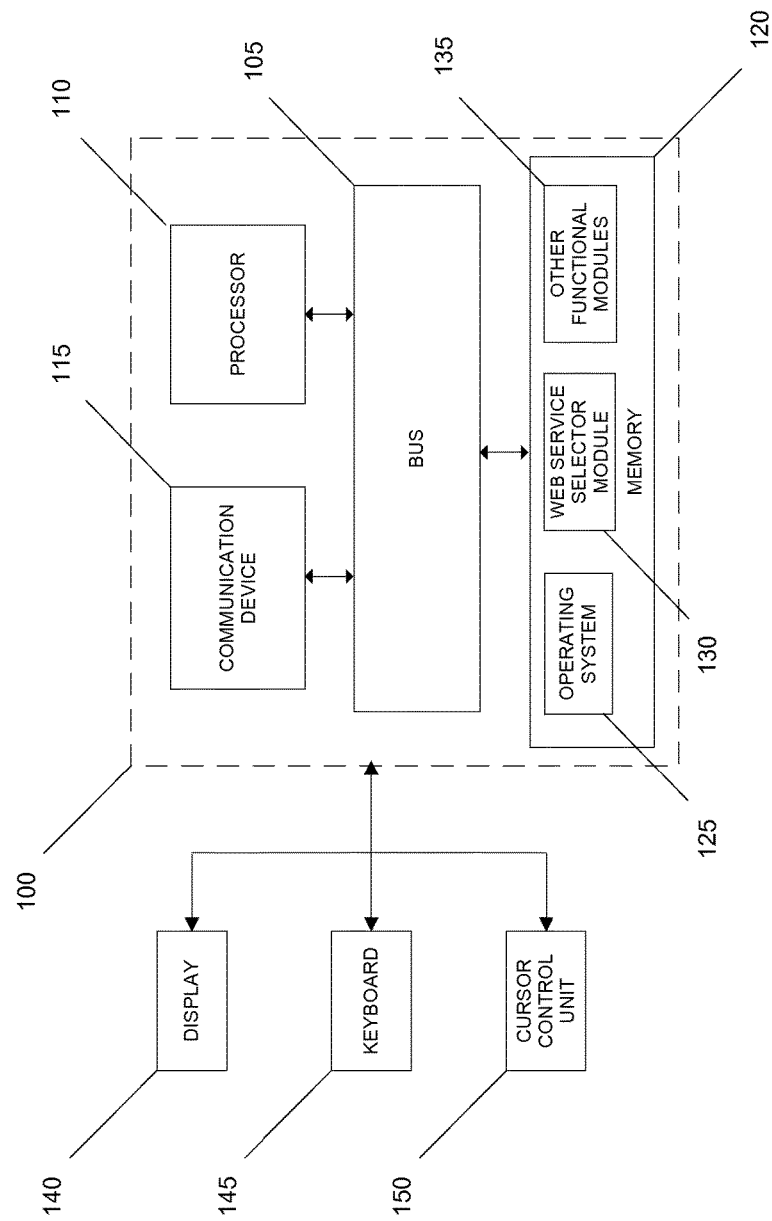
FIG. 1 illustrates a block diagram of a system with a web service selector component that can be implemented in one or more embodiments of the present invention.

FIG. 1 illustrates a block diagram of a system 100 with a web service selector module 130 that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and web service selector module 130, as well as other functional modules 135. Operating system 125 may provide operating system functionality for system 100. Because system 100 may be part of a larger system, system 100 may include one or more additional functional modules 135, such as a client module that submits requests to web service selector module 130 in order to determine the appropriate web service server to use.

Figure 2:
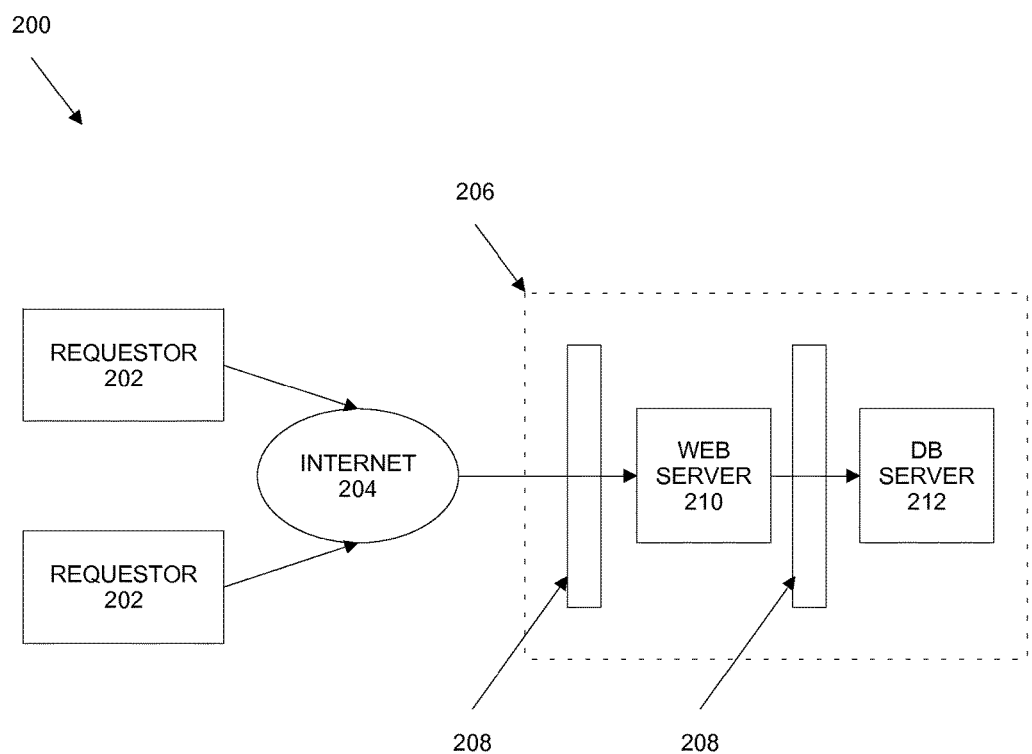
FIG. 2 illustrates an architecture for web service interactions, in accordance with an embodiment of the present invention.

FIG. 2 illustrates an architecture 200 for web service interactions, in accordance with an embodiment of the present invention. In this embodiment, the architecture shows a plurality of web service clients (or requestors) 202 communicating with a web services server 206 via Internet 204. Requestors 202 may connect to Internet 204 via either a wireless connection, a cellular connection, a wired connection, or any connection that will be appreciated by a person of ordinary skill in the art. Server 206 includes a plurality of firewalls 208, a web server 210, and a database server 212.

Figure 3:
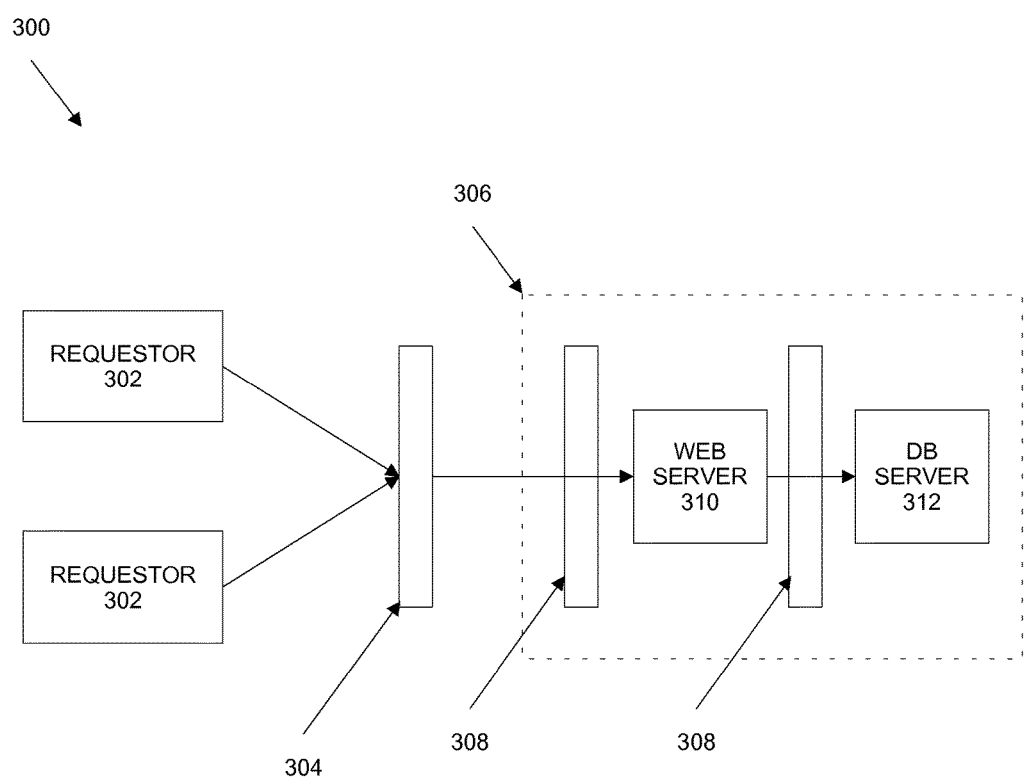
FIG. 3 illustrates an architecture for web service interactions, in accordance with an embodiment of the present invention.

FIG. 3 illustrates an architecture 300 for web service interactions, in accordance with an embodiment of the present invention. In this embodiment, the requestors 302 communicate to web services server 306 through a local area network 304 hosted within, for example, a corporate (or requestor's) infrastructure. This architecture is beneficial when a company addresses a multitude of commodity endpoints for consumption by internally facing clients/requestors 302 or, in other words, when there are no external requestors 302 via the Internet or other outside networks. Similar to FIG. 2, requestors 302 may access web services server 306 via wireless communication, cellular communication, wired communication, etc.

Figure 4:
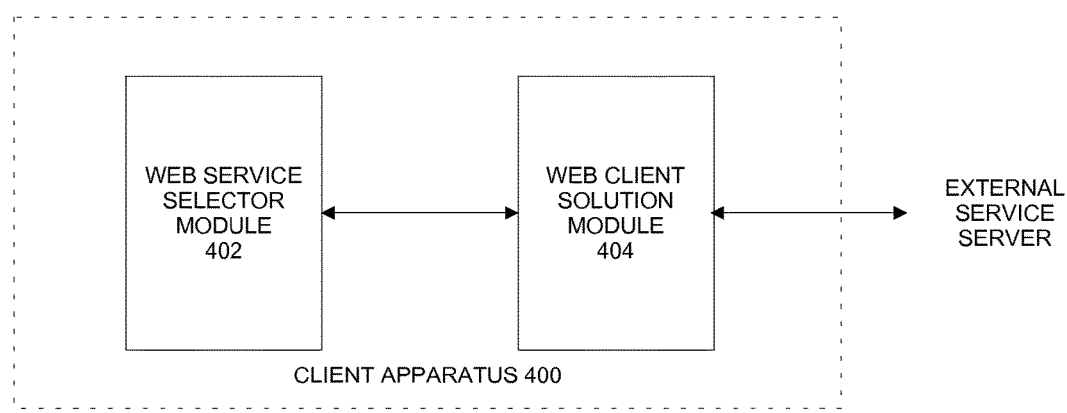
FIG. 4 illustrates a requestor apparatus, in accordance with an embodiment of the present invention.

FIG. 4 illustrates a requestor apparatus 400, in accordance with an embodiment of the present invention. Requestor (or client) apparatus 400 may be a client computer, server, etc., that includes a web server selector module 402 and a web client solution module (or client module) 404. Selector module 402 and client module 404 may cause a processor (not shown) to execute their functionalities. Client module 404 may be software that is dependent upon the consumption of commodity web services. Generally, most software that consumes web services calls the services via an endpoint Uniform Resource Identifier (URI). However, the embodiments described herein utilize selector module 402 that directs or instructs client module 404 to call a web service endpoint from a plurality of web service endpoints. It should be appreciated that selector module 402 can be included as part of a primary software solution (via direct source code implementation) or as part of a library component. However, in order for selector module 402 to instruct client module 404, an initiation phase is started at client module 404 just prior to requestor apparatus 400 needing to access a web service.

Client module 404 transmits a message to selector module 402 indicating the class of the commodity (for example, Geo-coding web service) that client module 404 requires to fulfill its request. Once the message is transmitted to selector module 402, client module 404 awaits a response as to which endpoint URI to use.

Selector module 402 receives the request from client module 404. Based upon the class of the commodity, the selector module 402 implements an Artificial Intelligence (AI) algorithm (using simulated annealing) over the listing of available web services to choose from. The simulated annealing algorithm is described in FIG. 6; however, the end result is to return the next endpoint URI (based on the AI algorithm) for client module 404 to access during its request. The endpoint URI that is returned may initially bounce around through a list of available endpoints and may gradually settle on a favorable commodity web service, at which point, the favorable web service can be returned to client module 404.

Once the URI is chosen via the AI algorithm, the endpoint is returned to client module 404 so that client module 404 may perform any necessary initialization steps and prepare to call the commodity web service.

Once the URI is received, client module 404 initiates a web request/response cycle to an external system (or server). Based upon the endpoint URI that was determined above, client module 404 may change any necessary internal properties prior to initiating the web service call. For example, if the response from the selector module was the URL https://webservice1.exampleprovider1.com/GeoCode/geoCode.asmx, then client module 404 may modify the code as such:
WebRequest client=new WebRequest( ) client.URI="https://webservice1.exampleprovider1.com/GeoCode/geoCode.asmx";

After the request is transmitted to the external system (or server), client module 404 waits for a response from the commodity web service (or the external system) and, once the response is received, client module 404 may then continue further processing. This can be implemented in software as either a synchronous or an asynchronous model, depending on which method is most appropriate to the web service client business requirements. Metrics such as response time and throughput are gathered in order to provide selector module 402 with additional feedback on web service reputation.

The response can be received and sent along to continue the normal program flow of client module 404. Along with this, a call is initiated back to selector module 402 in order to provide measured feedback on web service reputation such as response time and throughput. Selector module 402 receives the metrics and stores the metrics in local storage so that the next time a web service of this class is needed, the AI algorithm can use this information to further refine the reputation score that enables the algorithm to eventually settle on a favorable commodity web service selection. This feedback is also used to determine the heuristic score within the simulated annealing implementation.

Figure 5:
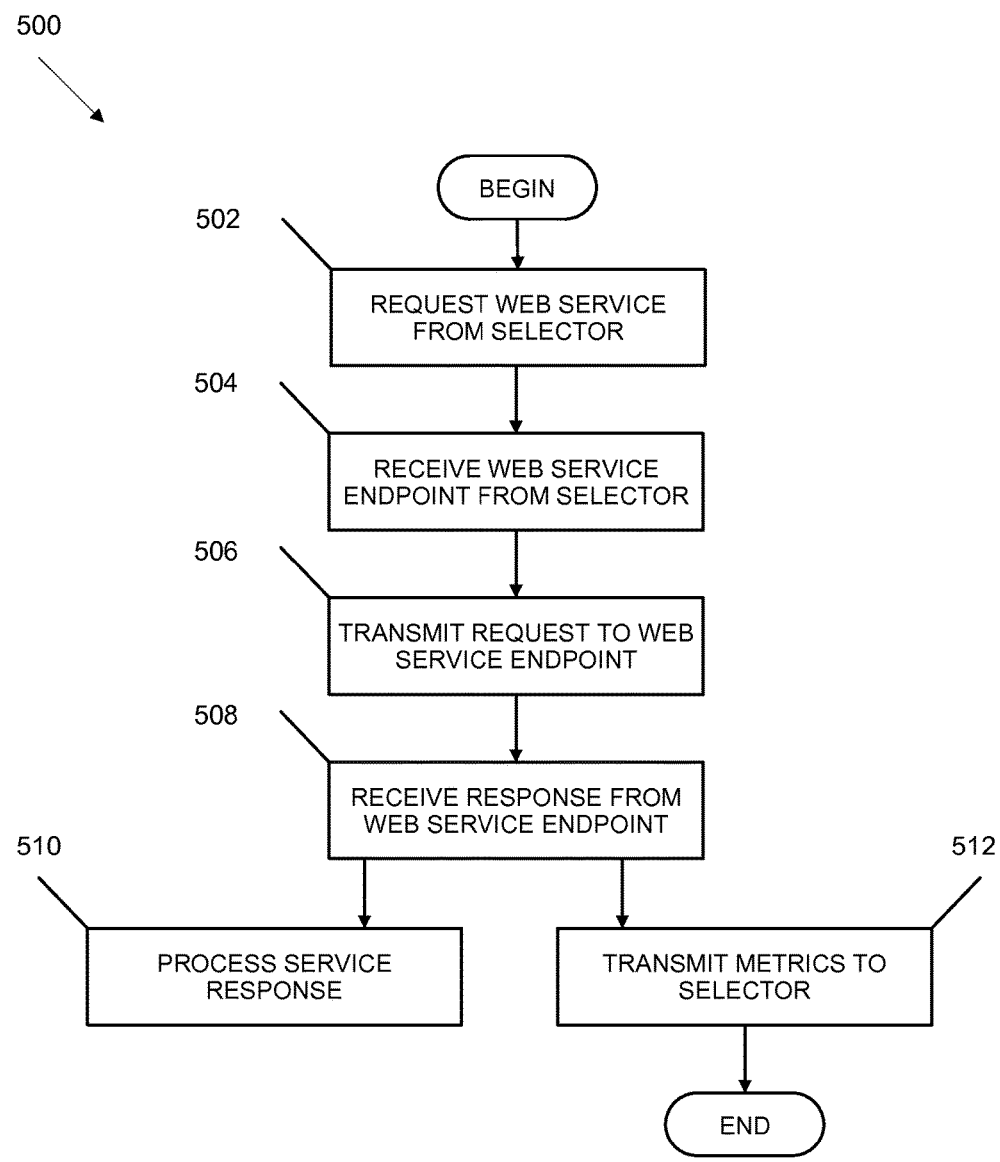
FIG. 5 illustrates a method for determining and selecting a web service server, in accordance with an embodiment of the present invention.

FIG. 5 illustrates a method 500 for determining and selecting a web service server, in accordance with an embodiment of the present invention. The following steps may be carried out by a processor, as shown in FIG. 1, or the processor as described in FIG. 4.

At 502, a client module transmits a request for a next available web service to a selector module. For instance, the client module submits a call to the selector module to inform the selector module that the client module needs to access a web service. The selector module is implemented either by a library or using inline source code (e.g., a class module). After running the iteration of the AI algorithm, the selector module arrives at the next web service endpoint URI for the client to use.

At 504, the client module receives the endpoint URI from the selector module. For example, the client module receives the endpoint URI from the selector module and the client module uses an endpoint URI value (e.g., this may entail setting properties or values within the code in order to dynamically change to the received endpoint) to access a web service.

At 506, the client module submits a request to the web service using the endpoint URI and receives a response at 508 from the web service. At 510, the service response is process by the client module. For example, the client module performs any necessary processing on the response payload, as well as gathers any necessary metrics related to the request/response interaction such as response time and throughput.

Simultaneously with 510, the metrics are transmitted at 512 to the selector module. For instance, any metrics that were gathered by the client module may be transmitted to the selector module and logged in a database or storage. This information may be vital, since the metrics are used to determine the endpoint URI of the web service during the AI algorithm. In other words, these metrics are gathered over time and used by the algorithm to determine the overall reputation score of the web service. It should be appreciated that in other embodiments, the service response may be processed at 510 first and then the metrics can be transmitted at 512 to the selector module.

Figure 6:
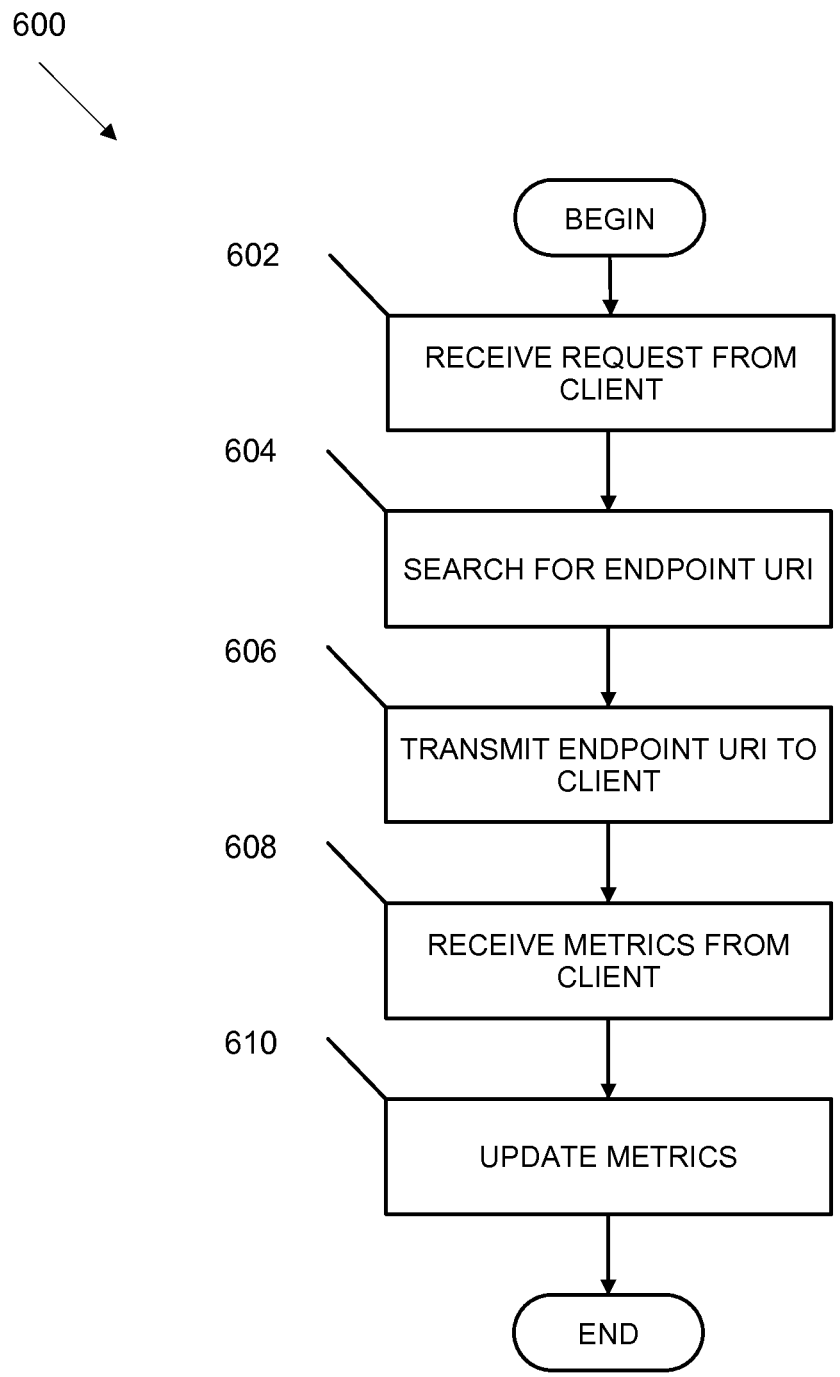
FIG. 6 illustrates a method for determining and updating an endpoint URI, in accordance with an embodiment of the present invention.

FIG. 6 illustrates a method 600 for determining and updating an endpoint URI, in accordance with an embodiment of the present invention. The method shown in FIG. 6 may be carried out by the processor shown in FIG. 1 when executed by web service selector module 130. At 602, a web service selector module receives a request for web services from a client module. Based upon the class of commodity desired by the client module, the web service selector module searches at 604 for the best available web services. The search is performed by annealing (or using a simulated AI algorithm) over a listing of available web services to determine an endpoint URI. The determined endpoint URI is a result of the annealing and illustrates a favorable web service for the client module. The determined endpoint URI is transmitted to the client module at 606. At 608, the selector module receives metrics (e.g., response time, throughput, etc.) associated with the endpoint URI from the client module. In other words, the received metrics serve as an indicator of the performance of the web service related to the endpoint URI. At 610, the selector module updates the metrics associated with the endpoint URI to refine further searches of web services.

It should be appreciated that in an alternative embodiment, the selector module may be attached to an external database via a wired or wireless connection in order to achieve external logging of metric information. This technique may be used to achieve a smaller "footprint" within the client while still maintaining the spirit of the embodiments described herein. This may be useful within the paradigm of mobile computing such as cell phones and PDAs.

The method steps shown in FIGS. 5 and 6 may be performed, in part, by a computer program, encoding instructions for a nonlinear adaptive processor to cause at least the methods described in FIGS. 5 and 6 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 5 and 6, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method performed in a client apparatus, comprising:

sending a request to a selector module located on the client apparatus, the request identifying a class of commodity for an available web service without indicating an endpoint for the available web service, wherein the selector module utilizes feedback metrics received from a client module;

selecting, by the selector module in the client apparatus, a web service endpoint from a list of web service endpoints in response to the request, the web service endpoint selected based on global optimization of feedback metrics stored by the selector module and the available web service, the list of web service endpoints being received from an external registry of web services and pre-stored in the client apparatus to enable selection of a web service without querying the external registry;

receiving a response from the selector module for a web service server, wherein the response comprises a uniform resource indicator corresponding to the selected web service endpoint to allow the client module located on the client apparatus to transmit the web service request to an appropriate web service server;

determining updated feedback metrics based on a request and response interaction that indicates a performance of the selected web service endpoint related to the uniform resource indicator, and wherein the client module gathers the updated feedback metrics for the selected web service endpoint for transmission to the selector module to update the feedback metrics stored on the client apparatus; and updating the stored feedback metrics by the selector module on the client apparatus based on the updated feedback metrics associated with the uniform resource indicator to refine further searches of available web services.

2. The computer-implemented method of claim 1, further comprising receiving another response from the web service server in response to the web service request.

3. The computer-implemented method of claim 2, wherein the web service request is transmitted to the web service server via Internet or a local area network.

4. The computer-implemented method of claim 1, further comprising calculating the metrics to determine an overall reputation regarding the web service server.

5. The computer-implemented method of claim 4, further comprising transmitting the calculated metrics to the selector module prior to requesting a next available web service.

6. The computer-implemented method of claim 4, wherein the metrics comprise response time and throughput of the web service server.

7. The computer-implemented method of claim 1, further comprising modifying the web service request prior to transmitting the web service request to the web service server based on the uniform resource indicator.

8. A computer-implemented method performed in a client apparatus, comprising:
   receiving, from a client module located on the client apparatus, a request for a web service server, the request identifying a class of commodity for a web service without indicating an endpoint for the web service;
   requesting a selector module located on the client apparatus for an available web service from a list of web services corresponding to the class of commodity identified in the request, wherein the selector module utilizes feedback metrics received from a client module;
   selecting a web service from the list based on global optimization of feedback metrics received from the client module and the available web service the list being received from an external registry of web services and pre-stored in the client apparatus to enable selection of a web service without querying the external registry;
   determining updated feedback metrics based on the request and response interaction that indicates a performance of the selected web service related to an endpoint uniform resource indicator, and wherein the client module gathers the updated feedback metrics for the selected web service provided by the web service server to update the feedback metrics stored on the client apparatus;
   updating the feedback metrics by the selector module on the client apparatus based on the updated feedback metrics associated with the endpoint uniform resource indicator to refine further searches of available web services;
   determining the web service server for the client module, in order for the client module to transmit a web service request to the web service server, wherein a selection of the web service is provided by the selector module located on the client apparatus and is based on the updated feedback metrics and wherein the selector module utilizes the metrics received from the client module; and
   transmitting the endpoint uniform resource indicator of the web service server to the client module.

9. The computer-implemented method of claim 8, further comprising receiving the metrics associated with the web service server from the client module.

10. The computer-implemented method of claim 9, wherein the metrics comprise a response time and a throughput of the web service server.

11. The computer-implemented method of claim 9, further comprising based on the received metrics, updating metrics related to the web service server in a list of a plurality of web service servers.

12. The computer-implemented method of claim 11, further comprising generating a heuristic based on the updated metrics in order to determine a next available web service server.

13. A client apparatus, comprising:
   a non-linear adaptive processor; and
   memory comprising a set of instructions, wherein the set of instructions is configured to cause the processor to
      receive, from a client module located on the client apparatus, a request for a web service server, the request identifying a class of commodity for a web service without indicating an endpoint for the web service;
      request a selector module located on the client apparatus for an available web service, from a list of web services corresponding to the class of commodity identified in the request, wherein the selector module utilizes feedback metrics received from a client module;
      select a web service from the list based on global optimization of feedback metrics received from the client module and the available web service the list being received from an external registry of web services and pre-stored in the client apparatus to enable selection of a web service without querying the external registry;
      determine updated feedback metrics based on the request and response interaction that indicates a performance of the selected web service related to an endpoint uniform resource indicator, wherein the client module gathers the updated feedback metrics for the selected web service provided by the web service server to update the feedback metrics stored on the client apparatus;
      updating the feedback metrics by the selector module on the client apparatus based on the updated feedback metrics associated with the endpoint uniform resource indicator to refine further searches of available web services;
      determine the web service server for the client module in order for the client module to transmit a web service request to the web service server, wherein a selection of the web service is provided by the selector module located on the client apparatus, wherein the selector module utilizes the updated feedback metrics received from the client module; and
      transmit the endpoint uniform resource indicator of the web service server to the client module.

14. The apparatus of claim 13, wherein the set of instructions is further configured to cause the processor to receive the metrics associated with the web service server from the client module.

15. The apparatus of claim 14, wherein the metrics comprise a response time and a throughput of the web service server.

16. The apparatus of claim 14, wherein the set of instructions is further configured to cause the processor to, based on the received metrics, update metrics related to the web service server in a list of a plurality of web service servers.

\* \* \* \* \*